June 5, 1928.　　　　　　　　　　　　　　　　　1,672,452
P. L. FARMAN
SAFETY HEADLIGHT FOR AUTOMOBILES
Filed Aug. 24, 1926　　　　2 Sheets-Sheet 1

INVENTOR
Pearl L. Farman
By Victor E. Randall
Atty.

June 5, 1928.  
P. L. FARMAN  
1,672,452

SAFETY HEADLIGHT FOR AUTOMOBILES

Filed Aug. 24, 1926  2 Sheets-Sheet 2

INVENTOR  
Pearl L. Farman  
BY Victor E. Randall  
atty.

Patented June 5, 1928.

1,672,452

UNITED STATES PATENT OFFICE.

PEARL L. FARMAN, OF ATHENS, MICHIGAN.

SAFETY HEADLIGHT FOR AUTOMOBILES.

Application filed August 24, 1926. Serial No. 131,225.

My invention relates to safety head lights for automobiles wherein the lights are coupled by means of an adjusting rod and the two are simultaneously operated by means of an adjustable connecting rod operable from the steering crank.

Among other objects of my invention is to provide a couplet of lights wherein by the turning of the front wheels the head-lights will be automatically directed in the same direction as the travel of the vehicle, a feature of special significance in making curves where more or less shadow and darkness obscures the passage after nightfall. Another object of my invention is to provide an efficacious, simple and inexpensive radius rod for connecting the lamps and also an equally effective, simple and inexpensive directing rod connecting the steering crank with the lamp directing arm. Another object is to provide a stable, neat and easily installed lamp mounting bearing. Still another object is to so construct the lamp bearing whereby a lamp may be readily tilted on its mounting aside from being oscillated. These and other objects and advantages will be readily apparent to an artisan and to automotive operators in particular.

In the drawings forming a part of the specification,

Like marks of reference refer to corresponding or equivalent parts in the different views in which A, represents an automobile, B, its forward wheels and C, their fenders.

Figure 5:
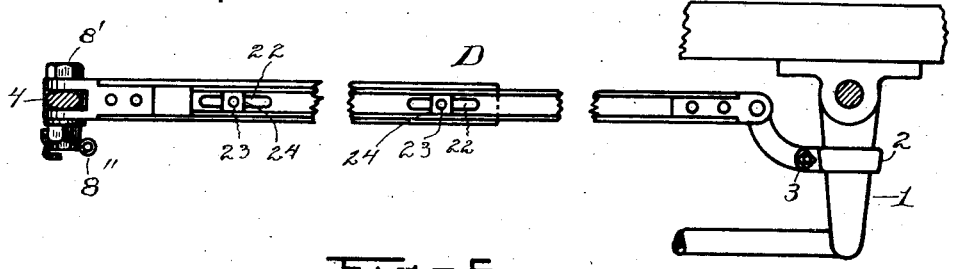
Fig. 5, is a detail inverse side view of the directing rod and its attachment in the steering crank of an automobile and a cross-section of the lamp journal directing arm near its attachment with said rod.

Journalled below the frame of the automobile is the usual shaft from which a steering crank 1, is mounted, and is shown as connected to the directing rod D, at one end by means of an adjustable clip 2, clasped about said crank and held by means of a tightening bolt 3. The opposite end of said rod is pivotally attached to the free end of a demountable arm 4 attached to the lower end of the lamp oscillating journal 5. This arm is oval transversely for the purpose of permitting the forked end of the directing rod D, to freely operate in its pivotal attachment with said arm, as shown in Fig. 5, in which view a bolt 8′ forms a pivot, a serrated nut being screw-threaded upon the lower end of said bolt and kept from turning by means of a cotter pin 8″.

Mounted upon the said frame members 6, and disposed in upward and diagonal outward angles the front wheel fenders C are mounted; the same not materially differing from fenders as generally in use, and upon these fenders the head lights 8, are supported. As the head lights, their brackets upon which they are mounted, the oscillating journals for supporting the lights, the bushings in which said journals are fitted, the tubular bearings for holding the bushings and the brackets upon the fenders in which the tubular bearings are mounted are substantially alike, a description of one is believed will suffice for the other.

Figure 1:
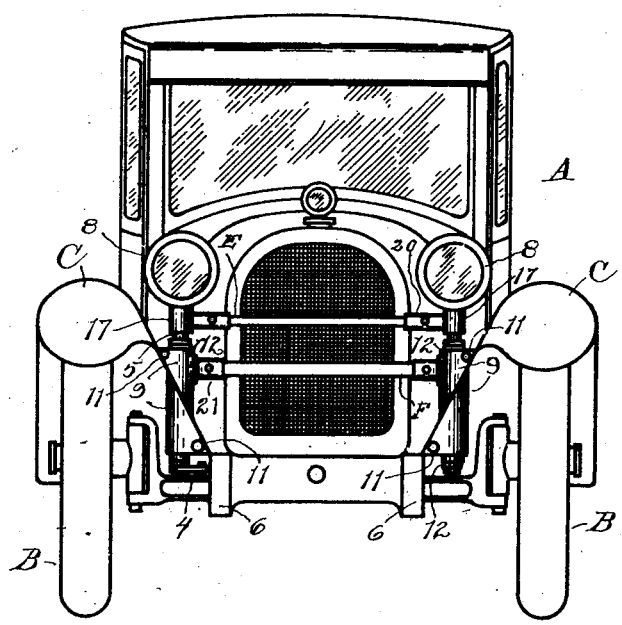
Fig. 1 represents a front view of an automobile with my improved safety head-lights attached.
Figure 2:
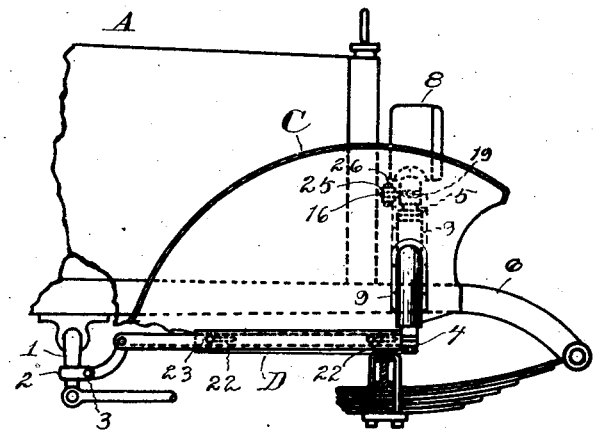
Fig. 2 is a partial side view, partly in section, of an automobile with my safety head-lights attached.
Figure 3:
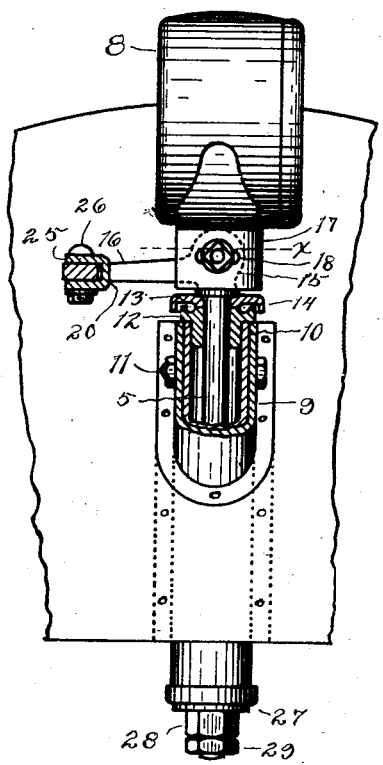
Fig. 3 is a detail side view of a broken fender, and a side view of a head light and its bearing partially in cross section, and a broken cross section of the radius rod in close proximity to its attachment with the arm to the lamp journal.
Figure 6:
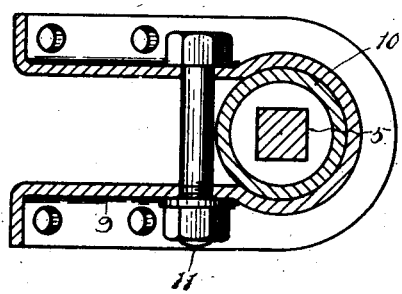
Fig. 6, is an enlarged detail cross-section thru a lamp journal bracket, its bearing and journal at a point where the tightening bolt is placed.
Figure 4:
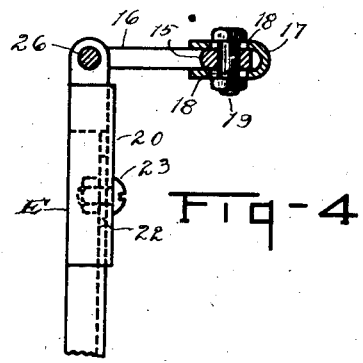
Fig. 4, is a detail plan view of the radius rod and a cross-section of the lamp bracket and the lamp journal on the line 4—4 of Fig. 3.

A triangular-shaped bracket 9, having its outer vertical angle curved to conform to a tubular bearing 10, demountably fitted in said bracket, is attached along its diagonally turned edges, to both the upper and under surfaces of a fender C. These brackets are inverse to one another and provide alined holders for said tubular bearing; it being understood that a suitable opening in said fender is made thru which said bearing extends, and to demountably secure said bearing within said brackets, tightening bolts 11, extend from side to side of said brackets in close proximity to said bearings, a method shown in Fig. 6. Within the ends of the tubular bearings 10, shouldered bushings 12, are placed. Shoulders of these bushings set on the ends of the bearing as shown. Preferably the upper bushings are formed with annular oiling grooves 13, from which a small drainage hole, not shown, is provided whereby lubricating oil may reach the oscillating journal 5, and its lower bushing. Antecedent to placing a journal within its bearings, an inverted cup-cap 14, is slid upon said journal as a dust and dirt guard for the oil groove of the upper bushing.

The upper end of a journal 5, is formed with a flattened head 15, from one edge (designated as its rear edge) an arm 16, extends, and to the free ends of corresponding arms of each lamp journal, a three piece radius rod E, is pivotally attached. A light-housing is provided with a depending sheet metal bracket 17, open between its rear side edges to permit an arm 16, to extend, and at its lower terminus to receive the flattened head 15 of a journal 5.

The brackets 17, have oppositely disposed elongated apertures 18, thru their sides, and thru these apertures, and extending thru the flattened heads of said journals, tightening bolts 19, are placed; a means whereby the head-lights may be slightly tilted in their mountings on said journals. A telescopically arranged brace F; is placed between the upper triangular lamp journal brackets. This brace; the directing rod D, and the radius rod E, are formed of sheet metal rolled in channel form disposed with edges toward the car to produce an æsthetic and pleasing effect.

The radius rod E, and the bracing element F, each carry end extensions 20 and 21, respectively. The end extension in both instances receiving the intermediate connecting portions of the respective parts. The intermediate portions of said parts being formed with longitudinal slots as 22, near their ends for receiving adjusting bolts 23, extending from said end extensions. As shown in Fig. 5, the adjusting bolts 23, are fitted with square nuts 24, lying with opposite edges against the channel sides of the rod, a method for preventing the turning of the nuts in tightening said bolts when adjusting the respective parts as expedient. The end members of the brace F, at one end, are burred and made fast to the brackets 9, by welding or riveting as expedient, whilst the end members of the radius rod E, is fitted with forked outer ends 25, striding the arms 16, of the oscillatory lamp journals, at which points they are provided with pivotal members 26. By preference the lamp journal to the right carries at its lower end a washer 27, and nut 28 and a lock nut 29, and the lamp journal to the left besides the directing arm 4, is provided with like or equivalent parts.

By the peculiar construction and arrangement of my improved head light mechanism, the parts are amenable to considerable variation and especially adapted for installation on cars of varying dimensions, and by providing the radius bar and the bracing member between the wheel fenders as set forth, all reasonable adjustments can be easily made and the job when finished has the appearance of an original equipped product. It is to be understood that in assembling the parts, the head-lights are arranged to throw their light rays in a direction of the travel of the machine either in a forward movement or in making curves over which its wheels travel.

I am aware that considerable variation might be resorted to in the formation and assembling of the parts of my improved head lights without detracting from the spirit, or sacrificing any of the advantages thereof, and I reserve the right to make and assemble the various elements in its construction that fall within the scope outlined in the appended claims.

I claim—

1. In a device of the class set forth, the combination with a lamp, a bearing for said lamp and a journal adapted to be oscillated in said bearing, of said journal having a flattened top extremity and formed with an arm disposed in the plane of said flattened portion, a bracket extending from said lamp and encasing the flattened portion of said journal on one edge and its sides, said arm adapted to extend outwardly from the open side of said bracket, said bracket having oppositely disposed slots in its sides and an adjusting bolt extending from the sides of said flattened portion and thru said slots and means to clamp said bracket to said bolt.

2. In a device of the class set forth, the combination with the steering crank of an automobile, head lights vertically journalled on the fenders of said automobile and means operable from said crank to simultaneously oscillate said head lights when said crank is moved to guide said automobile, of journals to which said head lights are mounted having flattened upper extremities and formed with arms extending from said flattened extremities at right angles in a common direction, brackets extending from said head lights and encasing said flattened extensions on their sides and edges opposite to said arms, said arms extending beyond said brackets and pivotally united by a connecting bar, means including tightening bolts passing through said brackets and flattened upper extensions of said journals whereby said lights may be adjustably tilted on said flattened extensions of said journals.

PEARL L. FARMAN.